(12) United States Patent
Yoshimoto

(10) Patent No.: US 9,175,719 B2
(45) Date of Patent: Nov. 3, 2015

(54) METHOD AND DEVICE FOR DETERMINING CENTER HOLE OF CRANKSHAFT

(75) Inventor: Akihiro Yoshimoto, Komatsu (JP)

(73) Assignee: KOMATSU NTC LTD., Toyama (JP)

(\*) Notice: Subject to any disclaimer, the term of this patent is extended or adjusted under 35 U.S.C. 154(b) by 1206 days.

(21) Appl. No.: 12/993,860

(22) PCT Filed: Jun. 25, 2009

(86) PCT No.: PCT/JP2009/061581
§ 371 (c)(1),
(2), (4) Date: Nov. 22, 2010

(87) PCT Pub. No.: WO2010/013560
PCT Pub. Date: Feb. 4, 2010

(65) Prior Publication Data
US 2011/0071806 A1 Mar. 24, 2011

(30) Foreign Application Priority Data
Jul. 30, 2008 (JP) .................................. 2008-195807

(51) Int. Cl.
*G01C 17/38* (2006.01)
*F16C 3/08* (2006.01)
(Continued)

(52) U.S. Cl.
CPC .. *F16C 3/08* (2013.01); *G01M 1/10* (2013.01); *G01M 1/24* (2013.01); *G05B 19/401* (2013.01);
(Continued)

(58) Field of Classification Search
CPC ....................................................... G01M 1/24
USPC ........................................................... 702/94
See application file for complete search history.

(56) References Cited

U.S. PATENT DOCUMENTS 4,884,210 A * 11/1989 Blaimschein .................. 700/159
5,131,143 A * 7/1992 Kirchberger ............... 29/888.08
(Continued)

FOREIGN PATENT DOCUMENTS

EP    1 760 443 A2    3/2007
EP    1 870 181 A1    12/2007
(Continued)

OTHER PUBLICATIONS

European Search Report of corresponding EP Application No. 09 80 2805.3 dated Nov. 23, 2011.
(Continued)

*Primary Examiner* — Sujoy Kundu
*Assistant Examiner* — Steven J Malone
(74) *Attorney, Agent, or Firm* — Global IP Counselors, LLP (57) ABSTRACT

A method of determining a center hole of a material crankshaft, which is obtained through molding with first and second molds, includes: obtaining first shape data of a first portion of the material crankshaft molded by the first mold and second shape data of a second portion of the material crankshaft molded by the second mold; comparing the first and second shape data respectively with first and second designed data corresponding to the first and second molds, respectively, for computing a misalignment amount of each of the first and second portions due to misalignment between the first and second molds; adjusting, based on the misalignment amount, data corresponding to the misalignment amount to reproduce actual shape data; and determining, based on the actual shape data, a position of the center hole in the material crankshaft such that a rotation balance of the material crankshaft is within a predetermined range.

10 Claims, 7 Drawing Sheets

(51) Int. Cl.
  *G01M 1/10* (2006.01)
  *G01M 1/24* (2006.01)
  *G05B 19/401* (2006.01)
  *G05B 19/4097* (2006.01)

(52) U.S. Cl.
  CPC ......... *G05B 19/4097* (2013.01); *B23P 2700/07* (2013.01); *G05B 2219/32189* (2013.01); *G05B 2219/37205* (2013.01)

(56) References Cited

U.S. PATENT DOCUMENTS 6,038,489 A * 3/2000 Pickles et al. .................. 700/164
6,698,095 B1 * 3/2004 Assie .......................... 29/888.08

FOREIGN PATENT DOCUMENTS

| | | |
|---|---|---|
| JP | 51-76682 A | 7/1976 |
| JP | 3-254327 A | 11/1991 |
| JP | 5-349 A | 1/1993 |
| JP | 9-174382 A | 7/1997 |
| JP | 10-62144 A1 | 3/1998 |
| JP | 2007-264746 A1 | 10/2007 |

OTHER PUBLICATIONS

International Search Report of corresponding PCT Application No. PCT/JP2009/061581.

\* cited by examiner

METHOD AND DEVICE FOR DETERMINING CENTER HOLE OF CRANKSHAFT

CROSS-REFERENCE TO RELATED APPLICATIONS

This national phase application claims priority to Japanese Patent Application No. 2008-195807 filed on Jul. 30, 2008. The entire disclosure of Japanese Patent Application No. 2008-195807 is hereby incorporated herein by reference.

TECHNICAL FIELD

The present invention relates to a method of determining a center hole of a crankshaft, particularly, a method of determining a center hole of a crankshaft molded by casting or forging with top and bottom molds. The present invention further relates to a device for determining a center hole of a crankshaft similar to the above.

BACKGROUND ART

The crankshaft is normally used when installed in an engine. When the rotational imbalance occurs in the crankshaft, a variety of troubles occur (e.g., generation of vibration in the engine revolution). Therefore, the amount of the rotational imbalance (hereinafter simply referred to as "an imbalance value") of a crankshaft is required to be in a predetermined allowable value range. A position of a center hole, used as a reference for working the crankshaft, is important for setting the imbalance value of the crankshaft to be in the allowable value range.

For example, a center hole is formed as follows. First, a balance center axis of a crankshaft of a material state (i.e., a material crankshaft) is found. Specifically, a balance meter measures the balance of the material while the material crankshaft is actually revolved. Then, center holes are bored in both end surfaces of the crankshaft, on the obtained center axis. Further, the balance meter measures balance about the center axis again in the final working phase. When imbalance is found, the balance adjustment is executed by boring a hole in a counterweight.

When the crankshaft in a material state (i.e., the material crankshaft) is finished in an ideal shape, matching the design data, it is possible to easily achieve the imbalance value to be in the allowable value range by boring a center hole in the center of a main journal. Even if balance disruption occurs in the subsequent working steps, balance adjustment can be easily executed by boring a hole in the counterweight at the end.

However, thickness of the material crankshaft could be formed unevenly due to a variety of factors including e.g., failure of casting molds, failure of forging molds, impact in trimming and mold stripping. Most of the steps of working the material crankshaft are herein executed for a cylindrical part of a main journal and a cylindrical part of a pin journal. Therefore, the drawback of uneven thickness is resolved for the respective cylindrical parts. However, the thickness of the counterweight remains to be uneven because working is hardly executed for the counterweight. Consequently, the imbalance remains in the entire material crankshaft.

Imbalance accordingly exists in the entire crankshaft even when a hole is bored in the counterweight in the final balance adjustment. Further, when the balance adjustment cannot be completed within a predetermined cycle time, such a crankshaft is regarded as an inferior product. In this case, there is a limitation for the number of holes allowed to be bored in the balance adjustment. Therefore, an imbalance value within the allowable value range cannot be achieved in some cases.

Further, an essential portion could be required to be removed from the crankshaft in order to achieve the balance value within the allowable value range.

When the imbalance value of the crankshaft cannot be finally achieved within the allowable value range as described above, modification is required for treatment in the center hole boring processing. Specifically, the misalignment amount of the center hole boring position is computed based on the balance measurement. The misalignment amount is then fed back to the center hole boring processing. Treatment in the center hole boring processing is modified based on the feedback. When a center hole is herein bored in a material crankshaft before the feedback of the misalignment amount, the material crankshaft is regarded as an inferior product due to misalignment of the center hole. Additionally, feedback of the misalignment amount is required every time a product lot of the material is changed. In this case, there is a drawback that a great number of processing steps are required.

Japan Laid-open Patent Application Publication No. JP-A-H09-174382 describes a method as a technique for determining a position of a center hole in a crankshaft. In the method, sampling is performed for a plurality of materials, and statistic processing is executed for factors (e.g., a difference between an axial center in working of a center hole and a position of a bored center hole) affecting the imbalance amount after execution of a finishing work. Accordingly, the correction amount is obtained for determining the position of a center hole.

Further, Japan Laid-open Patent Application Publication No. JP-A-S51-076682 describes a technique for determining a position of a center hole in a crankshaft. In the method, a dynamic balance point is obtained for the respective end surfaces of a material crankshaft through a dynamic balance test. Subsequently, shapes of a journal section and the like in the material crankshaft are measured. Imbalance, possibly occurring after working, is arithmetically computed based on the result of the measurement. A center hole is then bored in a corrected position displaced from the dynamic balance point by the imbalance amount.

SUMMARY OF INVENTION

According to Japan Laid-open Patent Application Publication No. JP-A-H09-174382, it is required to collect the statistic data through preliminarily executing a variety of processes, such as the working of a lot of samples. The method has a drawback in that a large amount of effort, time, and cost is consumed. Further, the method has another drawback in that statistic tendency varies to a great extent depending on a manufacturing lot.

According to Japan Laid-open Patent Application Publication No. JP-A-S51-076682, in contrast, a center hole can be determined without using samples. However, a dynamic balance test is firstly required for detecting a reference position to determine the center hole. Therefore, the method has a drawback in that a highly expensive balance meter is required for executing the dynamic balance test.

It is an object of the present invention to provide a technique for easily and appropriately determining the position of a center hole of a crankshaft.

Solution to Problem

It is required to accurately grasp the actual shape of a material crankshaft in order to bore a center hole in an appropriate position on a crankshaft. In response, the present invention is designed to accurately compute an error with respect to a designed value of the material crankshaft with a simple method, and reproduce the actual shape of the material crankshaft based on the result.

The material crankshaft is normally molded by forging or casting using top and bottom molds. Errors of the material crankshaft are mostly produced due to misalignment between the top mold and the bottom mold in a molding process. Therefore, it is effective to execute an analysis of reproducing the actual shape of the material crankshaft separately with respect to a portion to be molded in the top mold and a portion to be molded in the bottom mold.

Meanwhile, it is empirically known that the respective portions to be molded in the top and bottom molds are finished in shapes roughly matching the designed shapes by the top and bottom molds. Further, material bending is another main factor of material errors. However, material bending does not contribute to deformation of the respective portions to be molded by the top and bottom molds. It is therefore concluded that a material error can be accurately computed by analyzing how the respective portions are moved in the entire crankshaft.

In view of the above, a method of determining a center hole of a crankshaft according to a first aspect of the present invention is a method configured to determine a center hole of a material crankshaft obtained through molding with a first mold and a second mold. The method includes: obtaining first shape data of a first portion molded by the first mold and second shape data of a second portion molded by the second mold; comparing the first and second shape data respectively with first and second designed data corresponding the first and second molds, respectively, for computing a misalignment amount of each of the first and second portions due to misalignment between the first mold and the second mold; adjusting, based on the misalignment amount, data corresponding to the misalignment amount so as to reproduce actual shape data; and, determining, based on the actual shape data, a position of the center hole in the material crankshaft such that a rotation balance of the material crankshaft is within a predetermined range.

According to first aspect of the present invention, the shape data are measured for the respective portions molded by the first and second molds. The misalignment amount is computed based on the measured data and the designed data. The data corresponding to the misalignment amount is interpolated for reproducing the actual shape data. Therefore, it is possible to obtain effective actual shape data based on a relatively small number of measured data. Further, an expensive balance meter is not herein required.

The method of determining a center hole of a crankshaft according to a second aspect of the present invention relates to the method of determining a center hole of a crankshaft according to the first aspect of the present invention, wherein the obtaining of the first and second shape data includes obtaining two-dimensional data of the first portion molded by the first mold and two-dimensional data of the second portion molded by the second mold, with the first and second portions including in each of a plurality of counterweights of the crankshaft material and excluding axial parts of the crankshaft material.

It is revealed that errors are hardly produced when a crankshaft is molded by means of forging or casting because the respective portions of the crankshaft are molded in shapes matched with the designed shapes by the molds. Further, it is revealed that journals do not have impact on imbalance of the crankshaft. Therefore, the two-dimensional shape data, excluding the axial shape, are obtained for the respective counterweights in the second aspect of the present invention.

According to the method of determining a center hole of a crankshaft of the second aspect of the present invention, it is only required to obtain the shape data of the counterweights most affecting the rotational balance of the crankshaft. In addition, the required data is the two-dimensional shape data. Therefore, processing is easily executed.

The method of determining a center hole of a crankshaft according to a third aspect of the present invention relates to the method of determining a center hole of a crankshaft according to the first aspect of the present invention, wherein the obtaining of the first and second shape data includes obtaining the first and second shape data in at least four axial positions of the crankshaft material.

According to the method of determining a center hole of a crankshaft of the third aspect of the present invention, it is possible to measure a material error due to bending by measuring the shape data of each of the portions in at least four axial positions.

The method of determining a center hole of a crankshaft according to a fourth aspect of the present invention relates to the method of determining a center hole of a crankshaft according to the first aspect of the present invention, wherein the comparing of the first and second shape data respectively with the first and second designed data includes computing the misalignment amount based on a position that is computed to be where the first and second shape data and the first and second designed data, respectively, are most approximate to each other, using a method of least squares.

The method of determining a center hole of a crankshaft according to a fifth aspect of the present invention relates to the method of determining a center hole of a crankshaft according to the first aspect of the present invention, wherein the adjusting of the data includes, when an overlapped section exists between the first portion and the second portion, removing data corresponding to the overlapped section to produce the actual shape data, and when the first portion and the second portion are separated from each other with a gap, interpolating data into the gap to reproduce the actual shape data.

The method of determining a center hole of a crankshaft according to a sixth aspect of the present invention relates to the method of determining a center hole of a crankshaft according to the first aspect of the present invention, wherein determining of the position of the center hole includes calculating a center line of inertia based on the actual shape data where products of inertia about the center line are zero.

A device for determining a center hole of a crankshaft according to a seventh aspect of the present invention is a device configured to determine a center hole of a material crankshaft that is obtained through molding with a first mold and a second mold. The device for determining a center hole of a crankshaft includes a shape data obtaining section, a misalignment amount computing section, an actual shape data reproducing section, and a center hole determining section. The shape data obtaining section is configured to obtain first shape data of a first portion molded by the first mold and second shape data of a second portion molded by the second mold. The misalignment amount computing section is configured to compare the first and second shape data respectively with first and second designed data corresponding the first and second molds, respectively, to compute a misalignment amount of each of the first and second portions due to misalignment between the first and second molds. The actual shape data reproducing section is configured to adjust, based on the misalignment amount, data corresponding to the misalignment amount so as to reproduce actual shape data. The center hole determining section is configured to determine, based on the actual shape data, a position of the center hole such that a rotation balance of the material crankshaft is within a predetermined range.

According to the present invention, it is possible to easily and accurately reproduce the actual shape of a crankshaft using a relatively small number of measured data and determine an appropriate position of a center hole.

DESCRIPTION OF EMBODIMENTS

Material Crankshaft

Figure 1:
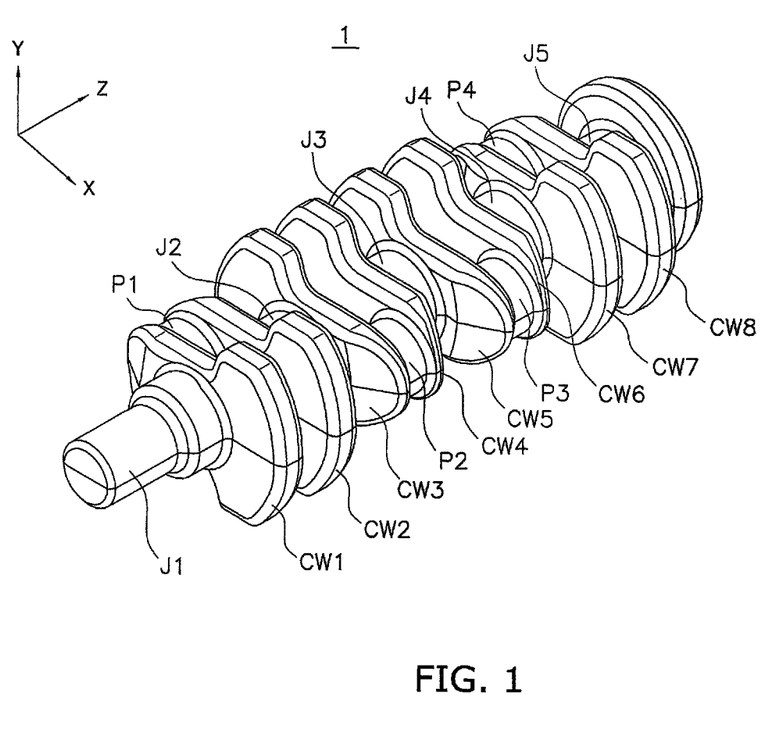
FIG. 1 is an external perspective view of an example of a crankshaft adopting an exemplary embodiment of the present invention.
Figure 2:
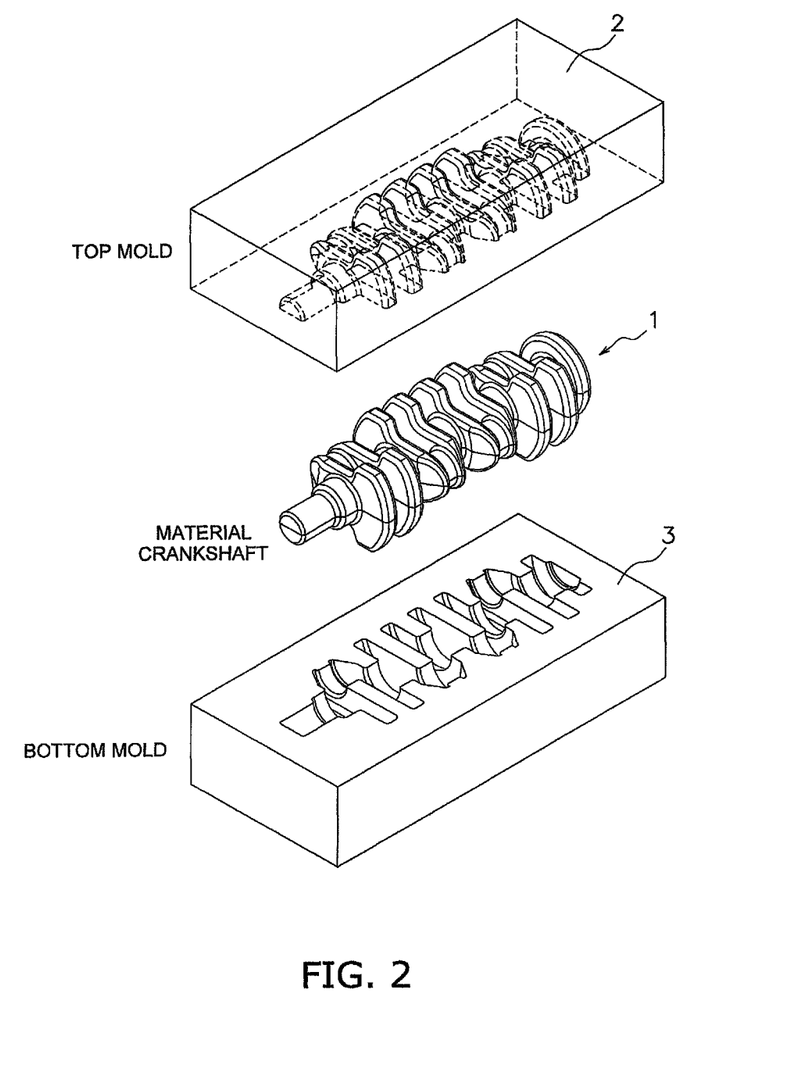
FIG. 2 is an external perspective view of the material crankshaft and top and bottom molds for molding the material crankshaft.

FIG. 1 illustrates an example of a material crankshaft. The material crankshaft is herein used for the serial 4-cylinder engines. As illustrated in FIG. 2, the material crankshaft 1 is molded through forging, using a top mold 2 and a bottom mold 3 (first and second molds). It should be noted that the present invention is similarly applicable to a material crankshaft molded through casting.

The material crankshaft 1 includes main journals J (J1 to J5), pin journals P (P1 to P4) and counterweights CW (CW1 to CW8). In the material crankshaft 1, the following components are sequentially disposed in a Z-axial direction: a main journal J1, a counterweight CW1, a pin journal P1, a counterweight CW2, a main journal J2, a counterweight CW3, a pin journal P2, a counterweight CW4, a main journal J3, a counterweight CW5, a pin journal P3, a counterweight CW6, a main journal J4, a counterweight CW7, a pin journal P4, a counterweight CW8, and a main journal J5.

Crankshaft Working System

Figure 3:
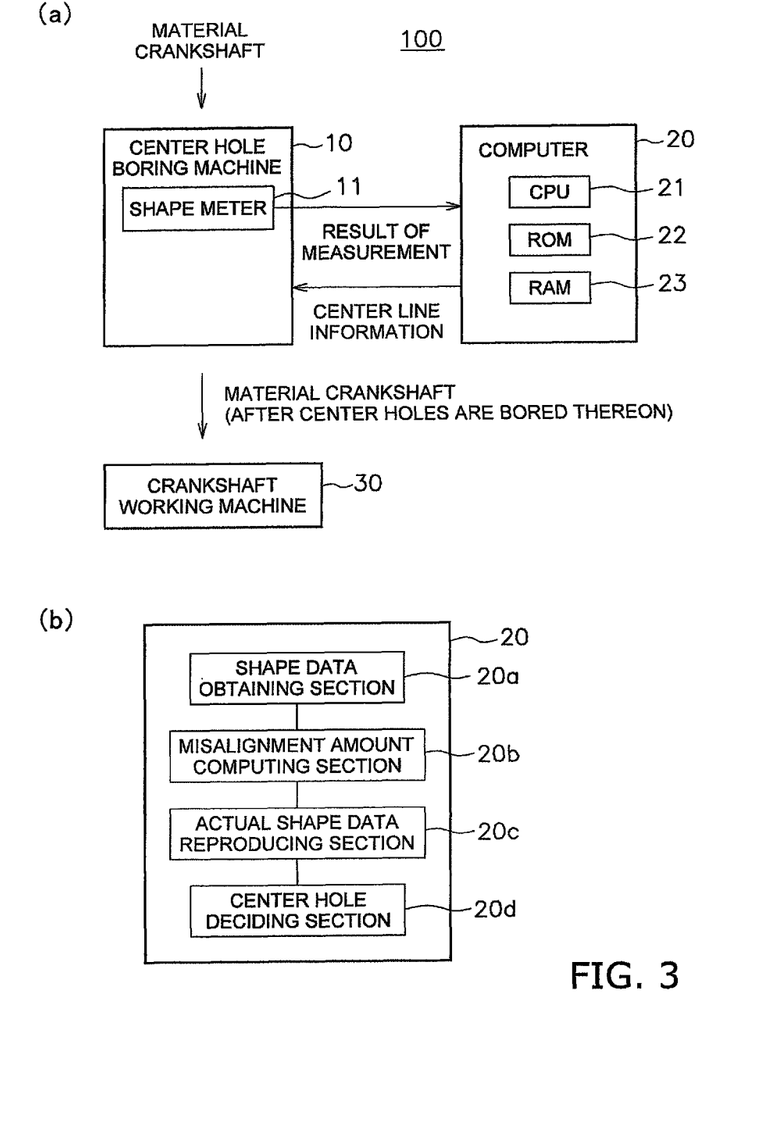
FIG. 3 is a configuration diagram of a working system of a material crankshaft.

Next, a crankshaft working system according to an exemplary embodiment of the present invention will be explained with reference to FIG. 3. FIG. 3 (a) is a hardware configuration diagram of the crankshaft working system according to the exemplary embodiment of the present invention. On the other hand, FIG. 3(b) is a functional configuration diagram of a computer 20 according to the exemplary embodiment of the present invention.

A crankshaft working system 100 includes a center hole boring machine 10, the computer 20, and a crankshaft working machine 30. The center hole boring machine 10 is an example of a working section configured to bore a center hole in each of the two end surfaces of the material crankshaft. The computer 20 is an example of a processor configured to determine the position of a center hole to be bored in each of the two end surfaces of the material crankshaft 1. The crankshaft working machine 30 is configured to execute a predetermined working for the material crankshaft after center holes are bored in the material crankshaft.

The center hole boring machine 10 includes a shape measuring machine 11, which is an example of a measurement section configured to measure the shape of the material crankshaft.

The shape measuring machine 11 includes a displacement meter such as a non-contact displacement meter (e.g., a laser displacement meter, an infrared displacement meter, or an LED displacement meter) or a contact displacement meter (e.g., a differential transformer). The shape measuring machine 11 is configured to measure the shape of the material crankshaft 1 based on a value measured by the displacement meter. In the present exemplary embodiment, the outer shapes of the counterweights of the material crankshaft 1 are only measured as described below. It should be noted that the shape measuring machine 11 may be a three-dimensional digitizer (i.e., an image scanner) configured to measure a measurement target from a plurality of different positions for generating three-dimensional shape data of the entire shape of a material crankshaft.

The computer 20 includes a CPU (Central Processing Unit) 21, a ROM (Read Only Memory) 22, and a RAM (Random Access Memory) 23.

The ROM 22 is configured to store a variety of programs to be run by the CPU 21 and a variety of information. In the present exemplary embodiment, the ROM 22 is configured to preliminarily store a processing program for determining positions of center holes in the material crankshaft 1 to be described. Further, the ROM 22 is configured to preliminarily store three-dimensional shape data of the design of the material crankshaft 1 (hereinafter referred to as "three-dimensional shape design data"). The outer shape data of the design of the respective counterweights of the material crankshaft 1 can be obtained from the three-dimensional shape design data. Further, the ROM 22 is configured to preliminarily store the content of working to be executed for the material crankshaft 1 by the crankshaft working machine 30.

The RAM 23 is configured to be used as a storage area for storing programs and data, or as a work area for storing data to be used for processes executed by the CPU 21.

As illustrated in FIG. 3(b), the computer 20 functions as a shape data obtaining section 20a, a misalignment amount computing section 20b, an actual shape data reproducing section 20c, and a center hole determining section 20d, when the CPU 21 reads a program stored in the ROM 22 into the RAM 23 and runs the read-out program. A variety of processes to be executed will be hereinafter described.

Explanation of Material Error

As described above, errors of the material crankshaft are produced due to misalignment between the top mold and the bottom mold in molding. For example, errors due to the misalignment between the top and bottom molds are produced when: the top and bottom molds are misaligned in the axial direction (i.e., the Z-axial direction) of the material crankshaft; the top and bottom molds are misaligned in the transverse direction (i.e., the X-axial direction) of the material crankshaft; the top and bottom molds are separated from each other; the top and bottom molds are disposed close to each other due to wearing of the matched surfaces thereof; arrangement angles of the top and bottom molds are misaligned; or a combination of at least two of the above. In any of the above cases, top and bottom portions of the material crankshaft molded by the top and bottom molds respectively are finished in roughly designed shapes of the top and bottom molds. In the present exemplary embodiment, it is therefore configured to easily and accurately reproduce the actual shape of the material crankshaft and effectively determine positions of center holes by grasping how the respective portions of the material crankshaft are displaced when molded by the top and bottom molds.

It should be noted that material errors include errors due to material bending. The following can be considered as material errors due to bending.

(1) Bending in Molding

When a material is molded by the top and bottom molds, the completed material is taken out from the molds by separating the top and bottom molds up and down. When the top and bottom molds are separated from each other, the material may remain attached to one of the molds. This may result in bending of the material.

(2) Bending in Removal of Burrs

After the molding of the material, a processing step is executed to remove burrs formed between the joined surfaces of the top and bottom molds. Bending of the material may occur while removing the burrs.

(3) Bending in Heating or Cooling

During molding of a material, temperature of the material is greater than or equal to 1,000 degrees Celsius. After molding, the material is cooled down. However, material bending may occur in the course of cooling. After molding, a quenching process may be executed for the material in order to enhance material strength. Material bending may also occur in the process.

When aforementioned bending occurs in the material crankshaft, however, the entire material crankshaft tends to be bent to a great extent whereas the respective portions of the material crankshaft are not deformed. Similarly to the above, the actual shape of the material crankshaft can be also reproduced by grasping displacement of the respective portions of the material crankshaft in the error due to material bending.

Further, a crankshaft for the V6 or V8 engine may also have angular errors as material errors during twisting of the material.

Explanation of Respective Portions

Figure 4:
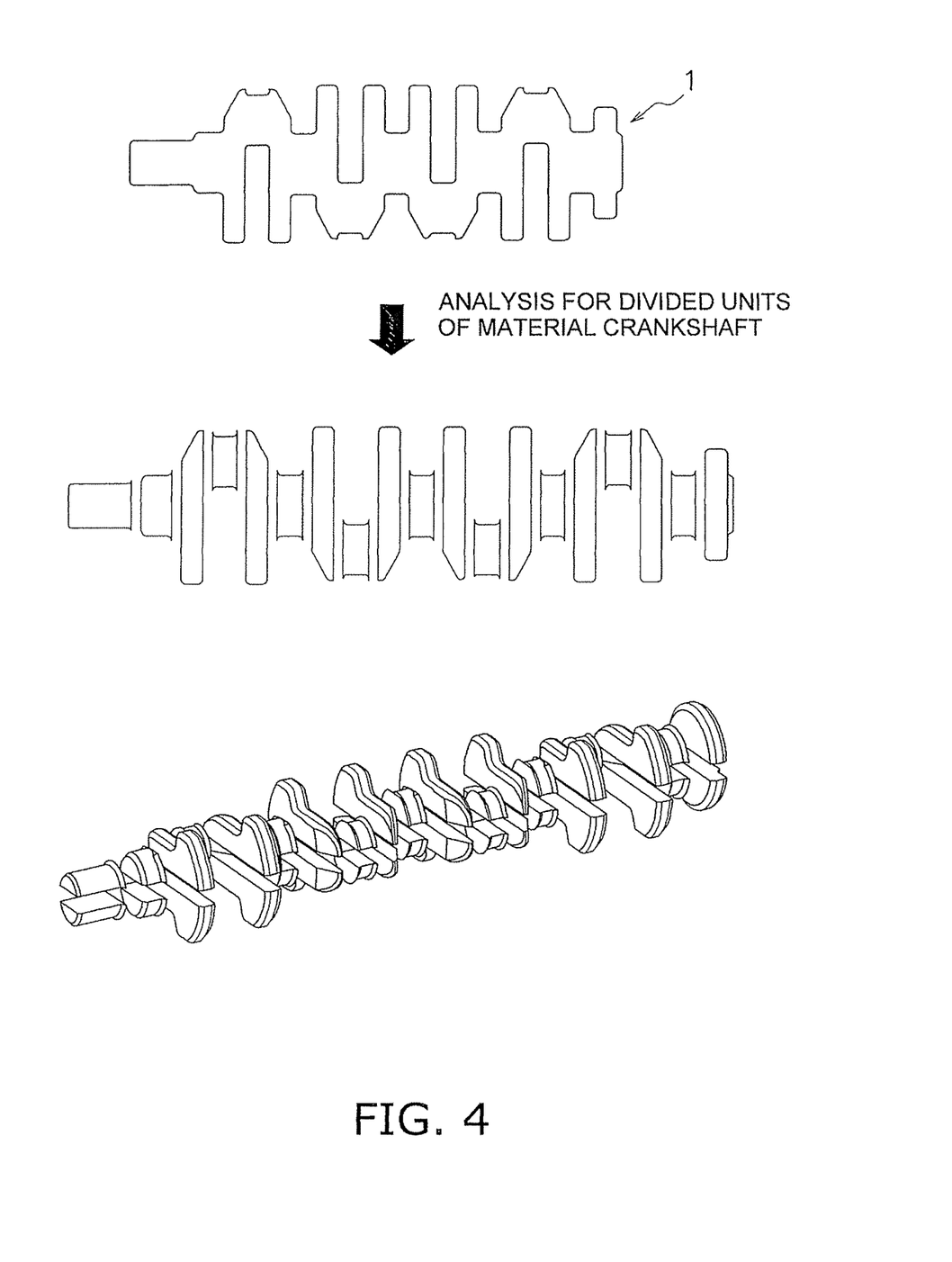
FIG. 4 is a diagram illustrating components of the material crankshaft, divided into data processing units.

As is obvious from the above, it is effective to execute a predetermined process for a plurality of divided portions of the crankshaft for reproducing the actual shape of the material crankshaft. As illustrated in FIG. 4, the crankshaft is herein divided into cylindrical parts and counterweights. Further, each of the divided parts is divided into a portion molded by the top mold and a portion molded by the bottom mold. The divided portions are respectively analyzed. It should be noted that the respective journals hardly have an impact on the imbalance of the crankshaft. Therefore, the process is configured to be executed only for the respective counterweights in the present exemplary embodiment.

Process of Reproducing Actual Shape Data

A process of reproducing the actual shape data will be hereinafter explained.

Process of Measuring Actual Shape of Material

First, the shape measuring machine 11 is configured to measure the shape of the material crankshaft 1 to obtain shape data of a portion of the material crankshaft 1 molded by the top mold 2 and shape data of a portion of the material crankshaft 1 molded by the bottom mold 3. Measurement positions are set for reliably observing the displacement amount of the respective portions of the material crankshaft 1. Specifically, as depicted with black dots in FIG. 5, the measurement positions correspond to the outer peripheral outline positions and axial lateral positions of each counterweight. In other words, as a result of the measurement, the two-dimensional shape of the respective portions molded by the top and bottom molds is determined for each counterweight, excluding the axial shapes of axial parts of the crankshaft material. It should be noted that FIG. 5 only schematically illustrates the measurement positions of each counterweight. In the actual situation, the shape of each counterweight is measured in more positions.

In measuring the material crankshaft 1, for instance, a displacement meter disposed in the surrounding of a work may be configured to measure the work while the work is being rotated. Alternatively, the displacement meter may be configured to measure the work while rotating about the work without rotating the work. Yet alternatively, two sensors may be configured to linearly move in the horizontal direction and measure the work, with the work vertically interposed therebetween.

Computation of Misalignment Amount

Figure 5:
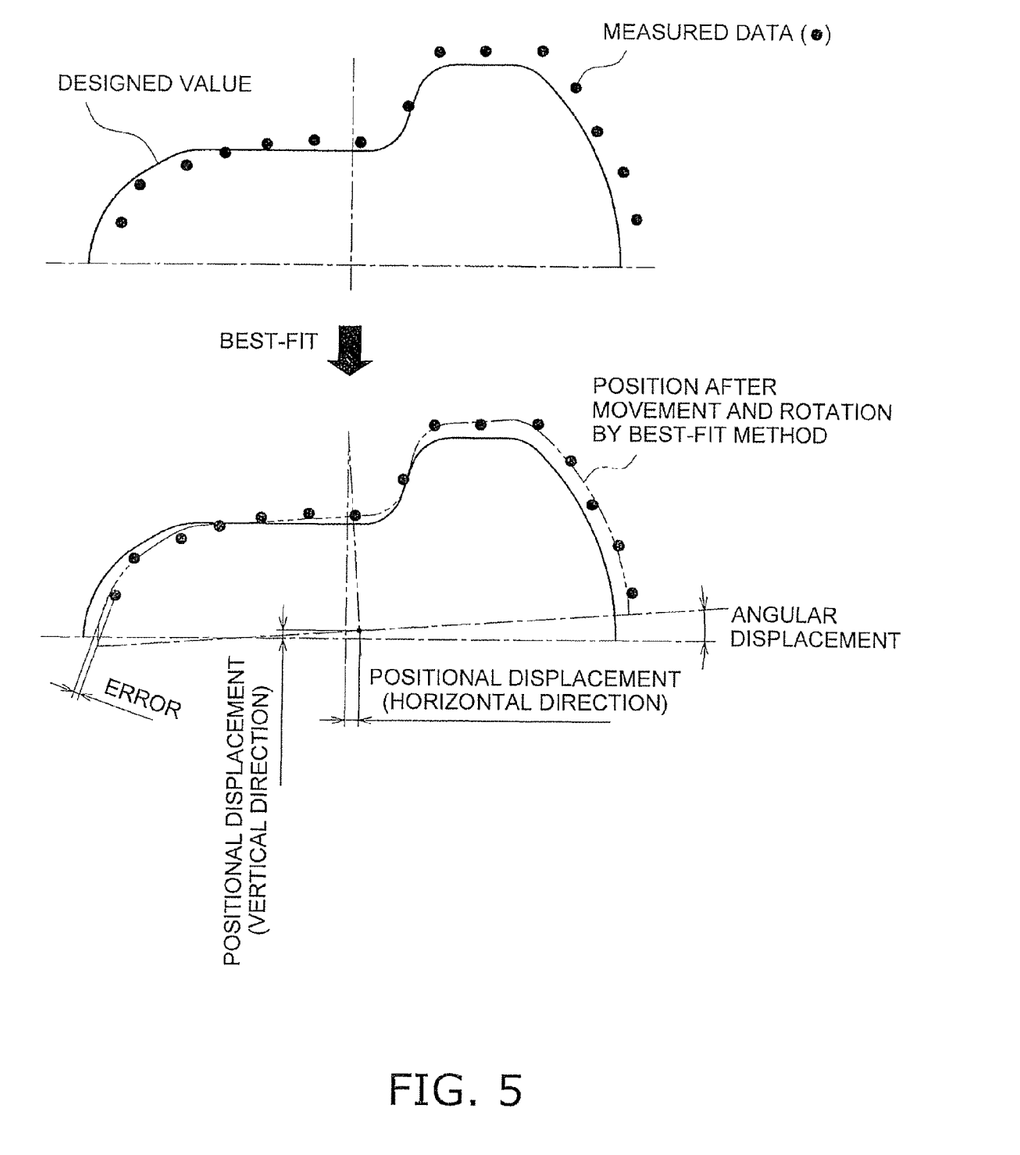
FIG. 5 is a diagram for explaining a method of computing the misalignment amount at each of the components.

The best-fit method is herein used for computing misalignment amount of the respective portions due to misalignment of the molds. As shown in FIG. 5, the data obtained by measurement does not match the designed value (designed data) in positions and angles. Therefore, the method of least squares is applied to the measured value and the designed value. Specifically, the designed data is moved and rotated for matching the measured data. Accordingly, a position is found for minimizing the sum of squares of a data error.

A displacement amount is obtained regarding the center of mass of a target portion using the aforementioned best-fit method. In FIG. 5, the displacement amount of the center of mass is shown as a vertical positional displacement and a horizontal positional displacement. Then, the aforementioned process is executed for the respective portions (i.e., a portion of each counterweight molded by the top mold and a portion of each counterweight molded by the bottom mold) in order to obtain the displacement amount of the center of mass of each portion. It should be noted that FIG. 5 also shows an angular displacement. The angular displacement is configured to be used in a data interpolation process to be described.

When a designed shape is herein moved and rotated based on the result of the best-fit method for the outer peripheral shape, related computation is executed under the premise that the designed shape is displaced while keeping the original state of the designed shape.

Data Interpolation Process Among Portions

Figure 6:
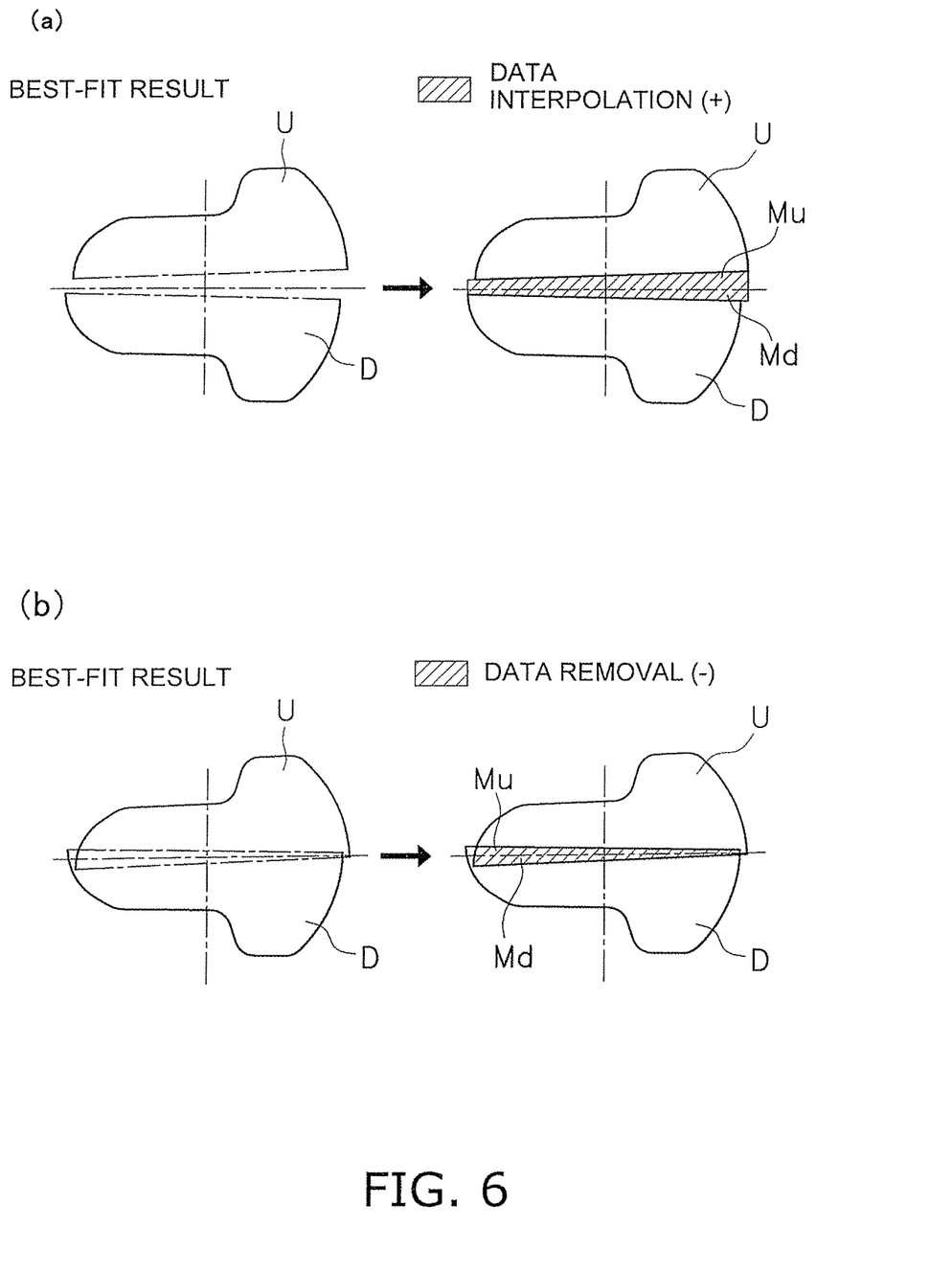
FIG. 6 is a diagram for explaining data interpolation processing regarding each of the components.

As a result of the aforementioned process for moving the respective portions of each counterweight, portions U and D may not be geometrically continuous, as illustrated in FIGS. 6(a) and 6(b). Specifically, the respective portions may be separated from each other as illustrated in FIG. 6(a). Alternatively, the respective portions may be overlapped with each other as illustrated in FIG. 6(b). In many cases, the top mold portion U and the bottom mold portion D tend to be separated from each other. Under the condition, data adjustment is required for the portions geometrically disconnected in order to reproduce the actual shape data.

When the respective portions are separated from each other, the interval between the portions is obviously filled with material in the actual shape of the portions. Therefore, data interpolation is required for reproducing the actual shape data. It should be noted that the interpolation process can be executed through computation based on the positional and angular displacements of each portion obtained in the preceding process of computing the misalignment amount.

When the respective portions are overlapped with each other, on the other hand, only one of the overlapped portions is filled with material. Therefore, one of the overlapped portions in the data is required to be removed in the data interpolation process. It should be noted that the process can be also executed through computation based on the positional and angular displacements of each portion similarly to the interpolation process for the aforementioned case.

Figure 7:
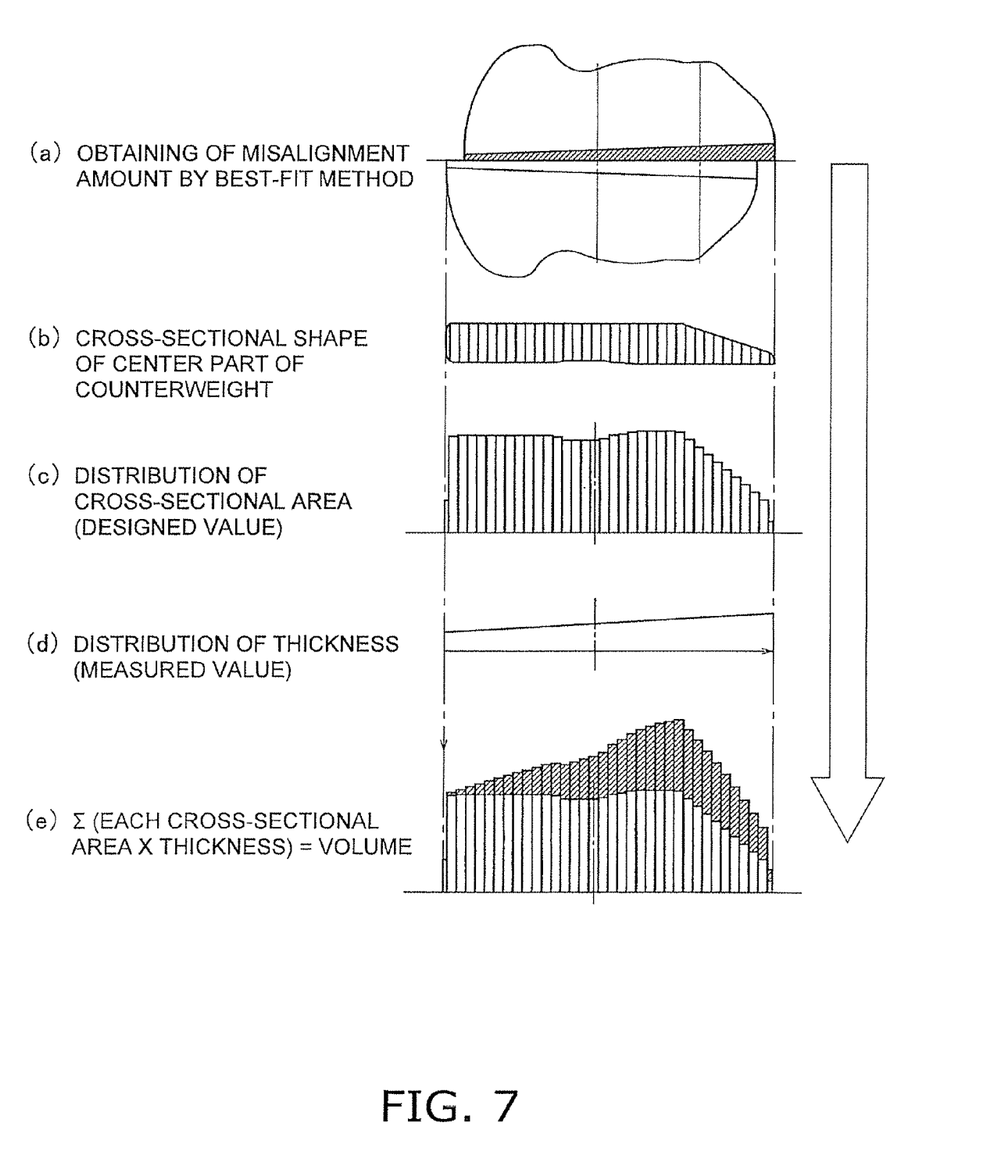
FIG. 7 is a diagram for explaining a process of computing the center of mass.

The axial shape data is not herein measured for each counterweight in executing the data interpolation process. Therefore, the design data is herein used for the cross-sectional shape of the center part without modification (see FIG. 7(b)). When no misalignment is produced between the top mold and the bottom mold, a data interpolation process may be simply executed based on the cross-sectional shape of the center part of each counterweight (the term "interpolation" herein refers to a concept including both of data addition and data removal). When angular misalignment is produced between the top mold and the bottom mold, on the other hand, cross-sectional thickness is not uniformly formed. Therefore, it is difficult to execute an accurate interpolation process if the data interpolation process is simply executed based on the cross-sectional shape of the center part of each counterweight.

Therefore, when angular misalignment is produced, the cross-section of the center part of each counterweight is divided into minute regions and area distribution of the minute regions is preliminarily obtained as illustrated in FIGS. 7(b) and 7(c). The data interpolation is executed by multiplying the cross-sectional area of each minute region and the thickness corresponding thereto, with reference to thickness distribution of each counterweight (see FIG. 7(d)), and summing the multiplication results for the respective minute regions (see FIG. 7(e)).

As illustrated in FIG. 6(a), the actual shape data can be accurately reproduced by computing mass and center of mass respectively for the top mold region U, the bottom mold region D, a top mold intermediate region Mu, and a bottom mold intermediate region Md of each counterweight through the aforementioned process.

Determination of Center Hole Position

Next, a center line of inertia of mass points is found where the respective portions (U, D, Mu, and Md) of each counterweight are assumed to be mass points. More specifically, based on the mass and the center of mass computed for each portion of each counterweight in the aforementioned process, a center line of inertia of 32 mass points (the crankshaft for the serial four-cylinder engine is herein used, and the number of mass points is accordingly equal to: 4×8=32 points) is found by solving a three-dimensional linear formula where products of inertia about the center line of inertia are set to be 0 (zero).

Then, a position of a center hole is found by substituting values of z coordinates at positions of the two axial end surfaces of the material crankshaft into the above obtained xy formula of the center line of inertia. The information is transmitted to the center hole boring machine 10. Then, a center hole is bored at a position on each of the two end surfaces of the material crankshaft 1.

After boring of the center holes in the material crankshaft, the crankshaft working machine 30 executes a predetermined working mainly for journals of the material crankshaft 1.

Features

Features of the aforementioned exemplary embodiment will be hereinafter described.

(a) The data interpolation process is executed by measuring the shape data for the respective portions of the material crankshaft molded by the top and bottom molds and computing the misalignment amount for the respective portions based on the fact that material errors occur in the material crankshaft mostly due to misalignment of the top and bottom molds. Therefore, shape measurement for obtaining the actual shape data and the data processing thereof will be simplified.

(b) Data processing is performed by measuring two-dimensional data excluding the axial shape of the material crankshaft, based on the fact that the material crankshaft roughly matches the designed shape by the top and bottom molds in the axial direction and an error in the axial direction barely exists. Accordingly, the data processing will be further simplified.

(c) Even when misalignment occurs in the journals due to misalignment between the top and bottom molds, the misaligned portion is cut off and does not exist in a finished state. In other words, misalignment of the journals is negligible. Therefore, data processing is not performed for journals. Accordingly, the data processing will be further simplified.

(d) In the present exemplary embodiment, the crankshaft for the serial four-cylinder engine is exemplified. However, a twisted crankshaft for the V6 or V8 engine can also be formed in an exactly the same way as the aforementioned crankshaft. In this case, twisting errors are only to be processed as angular errors. Further, for the V6 and V8 crankshaft, the center line of inertia is computed with an additional theoretical counterweight in computation.

Other Exemplary Embodiments (a) In the aforementioned exemplary embodiment, data processing is performed only for the counterweights, and not for the journals. However, data processing may be performed for the journals along with the counterweights. Alternatively, positional misalignment of the journals may be measured and positional misalignment of the counterweights may be estimated based on the positional misalignment of the journals.

(b) In the shape measurement process, the two-dimensional data is obtained. However, the three-dimensional data may be obtained instead.

(c) The center line of inertia is computed in determining positions of center holes. However, the process for determining positions of center holes is not limited to this.

(d) Shape measurement may be executed for all the counterweights. It should be noted that material errors, including material bending, can be grasped if shape measurement is executed in at least four positions in the axial direction.

According to the illustrated embodiments, it is possible to easily and accurately reproduce the actual shape of a material crankshaft using a relatively small number of measurement data. Meanwhile, it is also possible to appropriately determine positions of center holes.

The invention claimed is:

1. A method of determining a center hole of a material crankshaft that is obtained through molding with a first mold and a second mold, the method comprising using a computer and a shape measuring machine to:
    obtain first shape data of a first portion of the material crankshaft molded by the first mold by measuring the first portion;
    obtain second shape data of a second portion of the material crankshaft molded by the second mold by measuring the second portion;
    compute a first misalignment amount of the first portion due to a misalignment between the first and second molds by comparing the first shape data with first designed data corresponding to the first mold;
    compute a second misalignment amount of the second portion due to the misalignment between the first and second molds by comparing the second shape data with second designed data corresponding to the second mold;
    obtain first revised designed data based on the computed first misalignment amount;
    obtain second revised designed data based on the computed second misalignment amount;
    adjust, based on the misalignment amount, data corresponding to the misalignment amount so as to reproduce actual shape data; and
    determine, based on the actual shape data, a position of the center hole in the material crankshaft such that a rotation balance of the material crankshaft is within a predetermined range.

2. The method of determining a center hole of a crankshaft according to claim 1, wherein
    the obtaining of the first and second shape data includes obtaining two-dimensional shape data of the first portion molded by the first mold and two-dimensional shape data of the second portion molded by the second mold, with the first and second portions including each of a plurality of counterweights of the crankshaft material and excluding axial parts of the crankshaft material.

3. The method of determining a center hole of a crankshaft according to claim 1, wherein
    the obtaining of the first and second shape data includes obtaining the first and second shape data in at least four axial positions of the crankshaft material.

4. The method of determining a center hole of a crankshaft according to claim 1, wherein
    the computing of the first misalignment amount includes using a method of least squares to move and/or rotate the first designed data to a first position where the first designed data is most approximate to the first shape data,
    the computing of the second misalignment amount includes using a method of least squares to move and/or rotate the second designed data to a second position where the second designed data is most approximate to the second shape data,
    the first revised designed data corresponds to the first position, and
    the second revised designed data corresponds to the second position.

5. The method of determining a center hole of a crankshaft according to claim 1, wherein
    the adjusting of the data includes,
        when an overlapped section exists between the first portion and the second portion, removing data corresponding to the overlapped section to produce the actual shape data, and
        when the first portion and the second portion are separated from each other with a gap, interpolating data into the gap to reproduce the actual shape data.

6. The method of determining a center hole of a crankshaft according to claim 1, wherein
    determining of the position of the center hole includes calculating a center line of inertia based on the actual shape data where products of inertia about the center line are zero.

7. The method according to claim 1, further comprising using a center hole boring machine to bore the center hole at the determined position.

8. A device adapted to determine a position of a center hole of a material crankshaft that is obtained through molding with a first mold and a second mold, the device comprising:
    a shape measuring machine configured to detect shape data of the material crankshaft; and
    a computer, the computer including
        a shape data obtaining section configured to obtain first shape data of a first portion of the material crankshaft molded by the first mold by measuring the first portion, and obtain second shape data of a second portion of the material crankshaft molded by the second mold by measuring the second portion;
        a misalignment amount computing section configured to compare the first and second shape data respectively with first and second designed data corresponding to the first and second molds, respectively, to compute a first misalignment amount of the first portion and a second misalignment amount of the second portion due to misalignment between the first mold and the second mold, and to obtain first revised designed data and second revised designed data based on the first and second misalignment amounts;
        an actual shape data reproducing section configured to adjust, based on the misalignment amount, data corresponding to the misalignment amount so as to reproduce actual shape data; and
        a center hole determining section configured to determine, based on the actual shape data, the position of the center hole in the material crankshaft such that a rotation balance of the material crankshaft is within a predetermined range.

9. The device according to claim 8, further comprising a center hole boring machine operatively coupled to the computer and configured to bore the center hole at the position determined by the center hole determining section.

10. The device according to claim 8, wherein
    the misalignment amount computed by the misalignment amount computing section corresponds to misalignment between the first mold and the second mold in at least one of an axial direction of the material crankshaft, a transverse direction of the material crankshaft, and a mold closing/opening direction.

* * * * *